US010956995B1

(12) United States Patent
Fleischman et al.

(10) Patent No.: US 10,956,995 B1
(45) Date of Patent: Mar. 23, 2021

(54) USER-SPECIFIC TRAVEL OFFERS

(71) Applicant: Expedia, Inc., Bellevue, WA (US)

(72) Inventors: David Elias Fleischman, Issaquah, WA (US); Gregory Scott Mushen, Seattle, WA (US); Daniel Harrison Friedman, Mercer Island, WA (US); John C. Kim, Sammamish, WA (US); Benoit Jolin, Mercer Island, WA (US); Arthur Atherton Chapin, Bellevue, WA (US)

(73) Assignee: Expedia, Inc., Bellevue, WA (US)

( * ) Notice: Subject to any disclaimer, the term of this patent is extended or adjusted under 35 U.S.C. 154(b) by 471 days.

(21) Appl. No.: 15/217,804

(22) Filed: Jul. 22, 2016

Related U.S. Application Data

(60) Provisional application No. 62/196,260, filed on Jul. 23, 2015.

(51) Int. Cl.
*G06Q 50/14* (2012.01)
*G06Q 30/02* (2012.01)
*G06F 21/62* (2013.01)

(52) U.S. Cl.
CPC ......... *G06Q 50/14* (2013.01); *G06F 21/6254* (2013.01); *G06Q 30/0239* (2013.01)

(58) Field of Classification Search
CPC .................. G06Q 30/0239; G06F 21/6254
See application file for complete search history.

(56) References Cited

U.S. PATENT DOCUMENTS

| | | | |
|---|---|---|---|
| 8,600,805 B2 | 12/2013 | Wallace et al. | |
| 2010/0057560 A1* | 3/2010 | Skudlark | H04N 21/812 705/14.49 |
| 2011/0055008 A1* | 3/2011 | Feuerstein | G06Q 30/02 705/14.51 |
| 2012/0245996 A1* | 9/2012 | Mendez | G06Q 30/0241 705/14.49 |
| 2014/0108067 A1* | 4/2014 | Gluhovsky | G06Q 10/02 705/5 |
| 2014/0222473 A1* | 8/2014 | Patel | G06Q 30/08 705/5 |

OTHER PUBLICATIONS

Ivan Wen (2012) An Empirical Study of an Online Travel Purchase Intention Model, Journal of Travel & Tourism Marketing, 29:1, 18-39, DOI: 10.1080/10548408.2012.638558; document attached. (Year: 2012).*

* cited by examiner

*Primary Examiner* — Katherine Kolosowski-Gager
(74) *Attorney, Agent, or Firm* — Knobbe Martens Olson & Bear LLP (57) ABSTRACT

A user of a personal computing device may interact with a network-based travel service with respect to one or more travel items. The network-based travel service may monitor the users' interactions, determine user's travel interests, and provide relevant travel item provider devices information for generating user-specific offers. For example, anonymized user statistics, suggested terms for a user-specific offer, or estimated likelihood of acceptance may be provided to the travel item provider. The network-based travel service may receive and evaluate user-specific offers submitted by the travel item provider, cause presentation to corresponding users, and enable the users to accept, decline or propose modifications to the offers.

20 Claims, 5 Drawing Sheets

USER-SPECIFIC TRAVEL OFFERS

CROSS-REFERENCE TO RELATED APPLICATIONS

This application claims the benefit of U.S. Provisional Application No. 62/196,260, filed Jul. 23, 2015, the entire disclosure of which is incorporated by reference herein.

BACKGROUND OF THE INVENTION

Computing devices and computing networks are frequently employed by users to make purchases. For example, a user may purchase an item from a network-based retailer using his or her personal computing device. In particular, the practice of purchasing travel items has been made significantly easier with the advent of network-based travel services. By employing network-based travel services, users may browse or search for travel items, compare travel items offered for sale by multiple providers, and purchase travel items via his or her own computer. Network-based travel services, however, usually serve as a passive intermediary between travel item provider devices (e.g., hotels, restaurants, airliners, car rental agencies, etc.) and users. In most cases, network-based travel services merely relay travel items or their combinations, and present them in a uniform way to all users.

BRIEF DESCRIPTION OF THE DRAWINGS

Aspects and advantages of the embodiments provided herein are described with reference to the following detailed description in conjunction with the accompanying drawings. The drawings are provided to illustrate example embodiments described herein and are not intended to limit the scope of the disclosure.

DETAILED DESCRIPTION

Generally described, aspects of the present disclosure relate to enabling users of a network-based travel service to receive customized offers for one or more travel items. By way of illustrative example, travel items may include transportation goods or services (e.g., flights, automobile rentals, buses, trains, taxis, town cars, shuttles, etc.), lodgings (e.g., hotels, bed and breakfasts, hostels, resorts, etc.), activities (concerts, sporting events, amusement parks, recreation activities etc.), or any other travel related items (e.g., travel insurance). Specifically, a travel item marketplace is disclosed that enables providers of travel items, such as flights, lodging, etc., to create and transmit customized, user-specific offers for those travel items to users of the marketplace. For example, aspects of the present disclosure can enable a user who has recently browsed for a specific hotel room to receive an offer for the hotel room that is customized to the user, and that may include user-specific offer terms (e.g., user-specific discounts, upgrades, etc.). In some instances, the user can be enabled to identify certain browsed travel items for which to receive customized offers.

The present disclosure also enables providers of travel items to receive processed information regarding the activity of users on the travel item marketplace, in order to form the terms of user-specific offers. For example, a provider of hotel rooms may be notified that an anonymized user is currently viewing (or has recently viewed) their hotel rooms in the travel item marketplace, and may be incentivized to book a hotel room if offered modified booking terms (e.g., a discounted rate, a room upgrade, additional amenities, etc.). In some instances, providers may further be provided with suggested terms for a user-specific offer, as well as an estimated likelihood that a user would accept the user-specific offer.

As will be described below, suggested terms for offers and estimated likelihoods of acceptance may be based, for example, on a history of the user in the travel item marketplace. In some embodiments, providers may be enabled to automate user-specific offers, such that offers are generated by the travel item marketplace and delivered to users when specific conditions (e.g., a predicted acceptance rate) are met. The travel item marketplace can then present customized offers to corresponding users and enable the users to accept, decline or propose modifications to the offers. In some instances, the travel item marketplace prioritizes offers presented to users based on a quality measure of the offers (e.g., a likelihood of acceptance).

Figure 1:
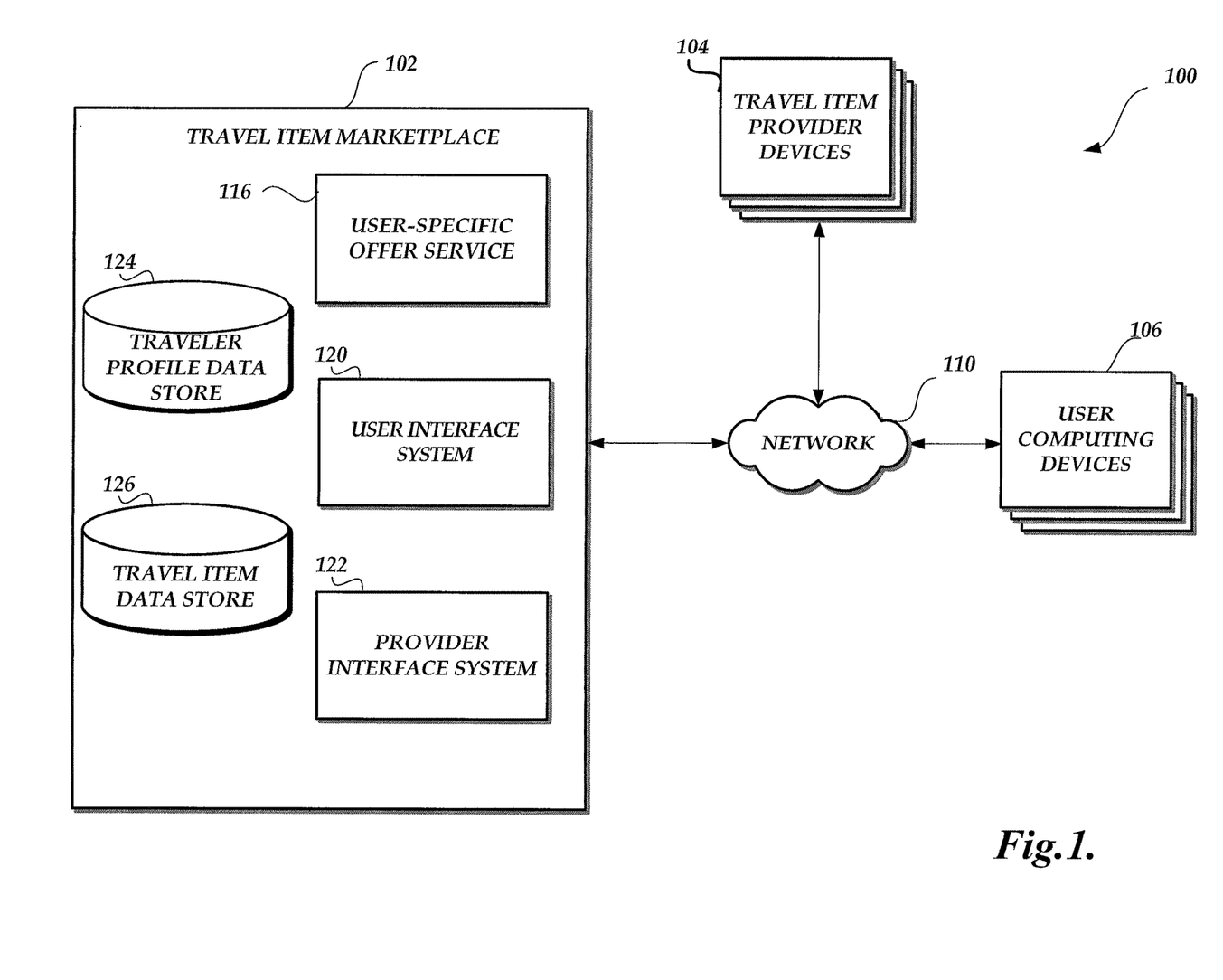
FIG. 1 is a schematic block diagram of an illustrative network environment in which a travel item marketplace may communicate with user computing devices and travel item provider devices for generating and transmitting information regarding user-specific offers.

FIG. 1 is a schematic block diagram of an illustrative network environment 100 in which a travel item marketplace 102 enables users to browse, search for, and acquire travel items made available by third party providers or the operator of the travel service 102. As depicted in FIG. 1, the illustrative network environment 100 includes one or more user computing devices 106, one or more travel item provider devices 104 and a travel item marketplace 102 in communication with one another via a communication network 110. A travel item provider, using a travel item provider device 104, may make travel items, or information regarding travel items, available to the travel service 102 via the network 110. The travel service 102 may then make the travel items, as well as other travel items, available to user computer devices 106. Accordingly, a prospective traveler, using a user computing device 106, may browse the travel items available from the travel service 102, search travel items, and acquire, reserve, or book one or more desired travel items. Moreover, as described in more detail below, a prospective traveler, using a user computing device 106, may receive customized offers for one or more travel items available on the travel item marketplace 102 based on the traveler's interactions with the travel item marketplace 102.

A user computing device 106 may include any communication device, such as a personal computer (PC), a kiosk, a thin client, a home computer, and a dedicated or embedded machine, that is capable of communicating with the network travel package service 102. Further examples may include without limitation laptop or tablet computers, personal computers, personal digital assistants (PDAs), hybrid PDAs/mobile phones, mobile phones, electronic book readers, set-top boxes, and the like. The user computing device 106 may communicate with the travel item market place 102 via the communication network 110, such as the Internet or a communication link. Those skilled in the art will appreciate that the network 110 may be any wired network, wireless network or combination thereof. In addition, the network 110 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A travel item provider device 104 may correspond to a computing device utilized by travel item providers to allow booking, reservation, or acquisition of travel items offered for acquisition by such providers. For example, the travel item provider device 104 may include a reservation system provided by a travel item provider (e.g., a specific airline, hotel or hotel chain, car rental agency, cruise line, bus service, etc.). In general, each travel item provider device 104 may enable other network-based devices, such as devices of the travel item marketplace 102 to request information regarding travel items (e.g., availability, price, travel plan, etc.), to search travel items, and to book, acquire, or reserve travel items. Further, each travel item provider device 104 may enable a travel item provider to receive notifications regarding users (e.g., utilizing user computing devices 106) with a high propensity to acquire a travel item on the travel item marketplace 102 and to generate and submit customized offers for delivery to such users.

Details regarding travel items available via a travel item provider device 104 may be stored by the travel item marketplace 102 within a travel item data store 126. The travel item data store can correspond to any physical data store, collection of physical data stores, or virtual data store implemented by one or more physical data stores, such as hard disk drives (HDDs), solid state drives (SSDs), tape drives, network attached storage (NASs) or any other persistent or substantially persistent storage component. In some instances, data within the travel item data store 126 may be obtained from travel item provider devices 104 (e.g., names, addresses, available booking types, etc.) via the provider interface system 122. In other instances, data within the travel item data store 126 may be obtained from alternative systems (not shown in FIG. 1), such as a centralized reservation system (CRS), a global distribution system (GDS), or any other system where multiple travel item providers, such as airlines, hotels, car rental agencies, cruise lines, bus services, etc., make travel items available for booking, reservation, and/or purchase. Operation of CRSs and GDSs is known within the art, and therefore will not be described herein. Still further, the travel item data store 126 may include information generated by the travel service 102 itself, or submitted to the travel service 102 by the user computing devices 106, such as reviews, ratings, pictures, or comments on various travel items. The travel item data store 126 may also include information retrieved or submitted by third party services, such as independent travel item rating services or travel agencies (not shown in FIG. 1).

In the illustrated embodiment, the travel item marketplace 102 is illustrated as a computer environment including several computer systems that are interconnected using one or more networks. More specifically, the travel item marketplace 102 may include a user interface system 120, a provider interface system 122, a user-specific offer service 154, a traveler profile data store 158, and a travel item data store 160. While shown in FIG. 1 as distinct systems, one or more of the user interface system 120, provider interface system 122, user-specific offer service 154, traveler profile data store 158, and travel item data store 160 may, in some embodiments, be combined into one or more aggregate systems. Further, it will be appreciated by those skilled in the art that the travel item marketplace 102 could have fewer or greater components than are illustrated in FIG. 1, including various Web services and/or peer-to-peer network configurations. In some embodiments, the one or more components of the travel service 102 may be implemented by virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. Thus, the depiction of the travel item marketplace 102 in FIG. 1 should be taken as illustrative and not limiting to the present disclosure.

Any one or more of the user interface system 120, the provider interface system 122, the user-specific offer service 154, the traveler profile data store 158, and the travel item data store 160 may be embodied in a plurality of components, each executing an instance of the respective user interface system 120, provider interface system 122, user-specific offer service 154, traveler profile data store 158, and travel item data store 160. A server or other computing component implementing any one of the user interface system 120, the provider interface system 122, the user-specific offer service 154, the traveler profile data store 158, and the travel item data store 160 may include a network interface, memory, processing unit, and computer readable medium drive, all of which may communicate which each other may way of a communication bus. The network interface may provide connectivity over the network 110 and/or other networks or computer systems. The processing unit may communicate to and from memory containing program instructions that the processing unit executes in order to operate the respective user interface system 120, provider interface system 122, user-specific offer service 154, traveler profile data store 158, and travel item data store 160. The memory may generally include RAM, ROM, other persistent and auxiliary memory, and/or any non-transitory computer-readable media. Additional details regarding implementation of a travel item marketplace (e.g., as a network-based travel service), as well as regarding communication between such a travel item marketplace and user computing devices, are provided within U.S. patent application Ser. No. 13/838,425, entitled "Managing Item Queries" and filed on Mar. 15, 2013 (hereinafter, the '425 application), as well as U.S. patent application Ser. No. 13/631,768, entitled "Managing Item Queries" and filed Sep. 28, 2012 (hereinafter, the '768 application), the entireties of which are hereby incorporated by reference.

In accordance with embodiments of the present disclosure, the travel item marketplace 102 includes a user interface system 120 for monitoring user activities and interacting with users with respect to user-specific offers, a provider interface system 122 for interacting with travel item provider devices 104 with respect to the generation and revision of user-specific offers, and an analysis component 116 for analyzing user information and evaluating user-specific offers in accordance with various functionalities disclosed herein.

Illustratively, the user interface system 120 can monitor or track an individual user's interactions or behavior as the user views, browses, or shops for travel items or otherwise interacts with the travel item marketplace 102. Monitoring the user's interactions with the travel item marketplace 102 may include, for example, monitoring the number, category, or sequence of travel items acquired, viewed or searched for by a user (e.g., via a network site corresponding to the travel item marketplace), and their associated dates, times, levels of service, etc. The user interface system 120 may achieve this by recording a history of specific network resources (e.g., Web pages, media items, etc.) that the user has accessed during each interaction with the travel item marketplace 102 (e.g., each browse session). Various identification techniques can be utilized to differentiate among users, for example, user login information, IP addresses, Web browser related identifiers (such as cookies), operating system related identifiers, network adaptor related identifiers, or any combination of same or similar identifiers. In some instances, the user interface system 120 may also receiving information regarding a user's interactions with other network services (not shown in FIG. 1), such as third-party online retail services of recreational or sporting goods. Various techniques for monitoring user interactions with third party services are known in the art, and therefore will not be discussed in detail herein.

Monitored information of users may be stored by the travel item marketplace 102 within a travel profile data store 126. The travel profile data store 126 may correspond to any persistent or substantially persistent data store, such as one or more hard disk drives (HDDs), solid state drives (SSDs), or network attached storage devices (NASs). The travel profile data store 126 may additionally store information regarding or submitted by users, such as a user's name, age, address, date of birth, credit card information, purchase history, and travel reservations, frequent flyer or rewards program information, etc., for use by the travel item marketplace 102.

Based on a user's monitored interactions, the travel item marketplace 102 (e.g., via the user-specific offer service 116) may identify travel item provider devices 104 associated with travel items of potential interest to the user. These travel items of potential interest may include travel items that have been viewed by a user, as well as travel items related to those viewed by the user (e.g., alternative travel items to those viewed, travel items combinable within a travel package to those viewed, etc.). In some instances, travel items of potential interest to a user may be based on a predicted travel interest of the user, which may be determined based on analysis of a user's behavioral data (e.g., the user activity monitored by the user interface system 120). Embodiments for predicting the travel interests (e.g., the desired travel plan) of a user are described in more detail within the '425 application, incorporated by reference above.

Thereafter, the travel item marketplace 102 may transmit a notification to each identified travel item provider device 104 indicating that a user may be interested in receiving customized offers for travel items associated with the travel item provider device 104 (e.g., provided by a travel item provider corresponding to the travel item provider device 104). The travel item marketplace 102 may include additional information within such a notification to enable the travel item provider to create a customized offer for the user, including but not limited to the user's predicted interest in a travel item, a predicted propensity of the user to purchase a travel item, a predicted value of the user to the provider (e.g., based on a history of brand loyalty, travel item purchases, etc.) or other information regarding the user. Based on the notification, one or more travel item providers may utilize a corresponding travel item provider device 104 to submit user-specific offers to the travel item marketplace 102 (e.g., via the provider interface system 122) for presentation to the user.

In some embodiments, the travel item marketplace 102 may evaluate offers received from the travel item provider devices 104 prior to delivery to a user computing device 106. For example, the travel item marketplace 102 may evaluate the offer's terms (e.g., discount, room upgrades, add-on services, availability, booking window, or length of stay restriction for a lodging offer) to determine a likelihood that a user will accept the offer. In one embodiment, the travel item marketplace 102 may decline to transmit offers with a likelihood of acceptance below a threshold value (e.g., 25%) to user computing device 102. In another embodiment, the travel item marketplace 102 may notify a travel item provider device 104 that a submitted offer has a likelihood of acceptance below a threshold value, and provide suggested alternative terms to the travel item provider device 104 that, if included within the offer, would raise the likelihood of acceptance above the threshold value. Illustratively, the user-specific offer service 116 can determine the likelihood of acceptance of an offer using statistical or historical travel-related transactional data, such as offer/acceptance data or regular sales data of similar travel items for similar users under similar conditions. For example, the user-specific offer service 116 may determine that, based on historical acceptance rates of similar users or offers, the proposed offer has a 50% likelihood of being accepted by an individual user or within a range of targeted users. In some embodiments, the travel item marketplace 102 may recommend offer settings or hints to travel item provider devices 104 to alter the likelihood of acceptance of an offer. For example, the travel item marketplace 102 may recommend alternative offer terms to the travel item provider device 104 to raise the likelihood of acceptance by a user above a threshold value. The travel item marketplace 102 can then enable a travel item provider to accept or reject the alternative offer terms, after which the offer can be transmitted to a user computing device 106 for presentation to a user.

Figure 2A:
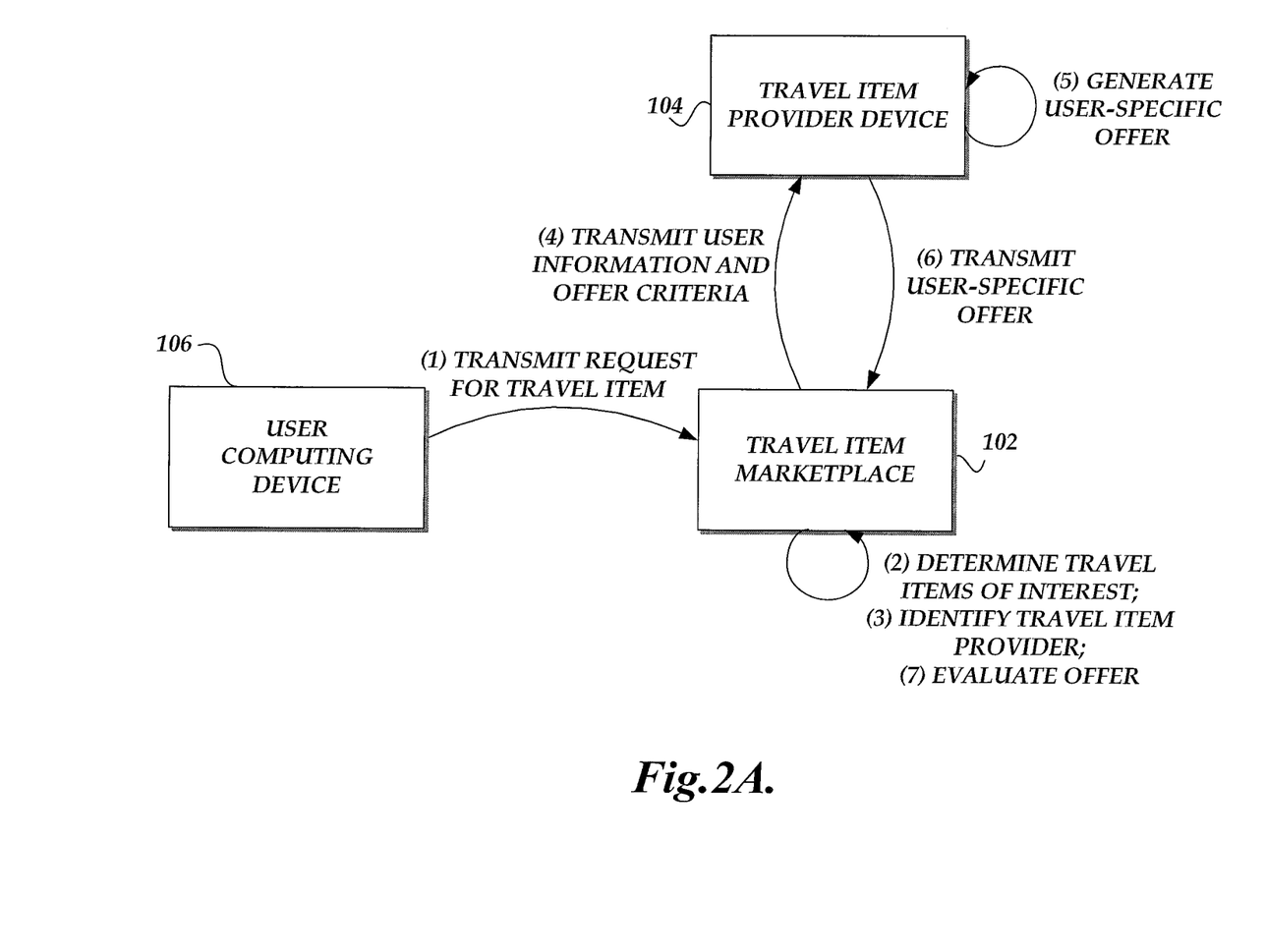
FIGS. 2A and 2B are illustrative block diagrams depicting the generation of a user-specific offer and subsequent operations related to the user-specific offer, as performed in the network environment of FIG. 1.
Figure 2B:
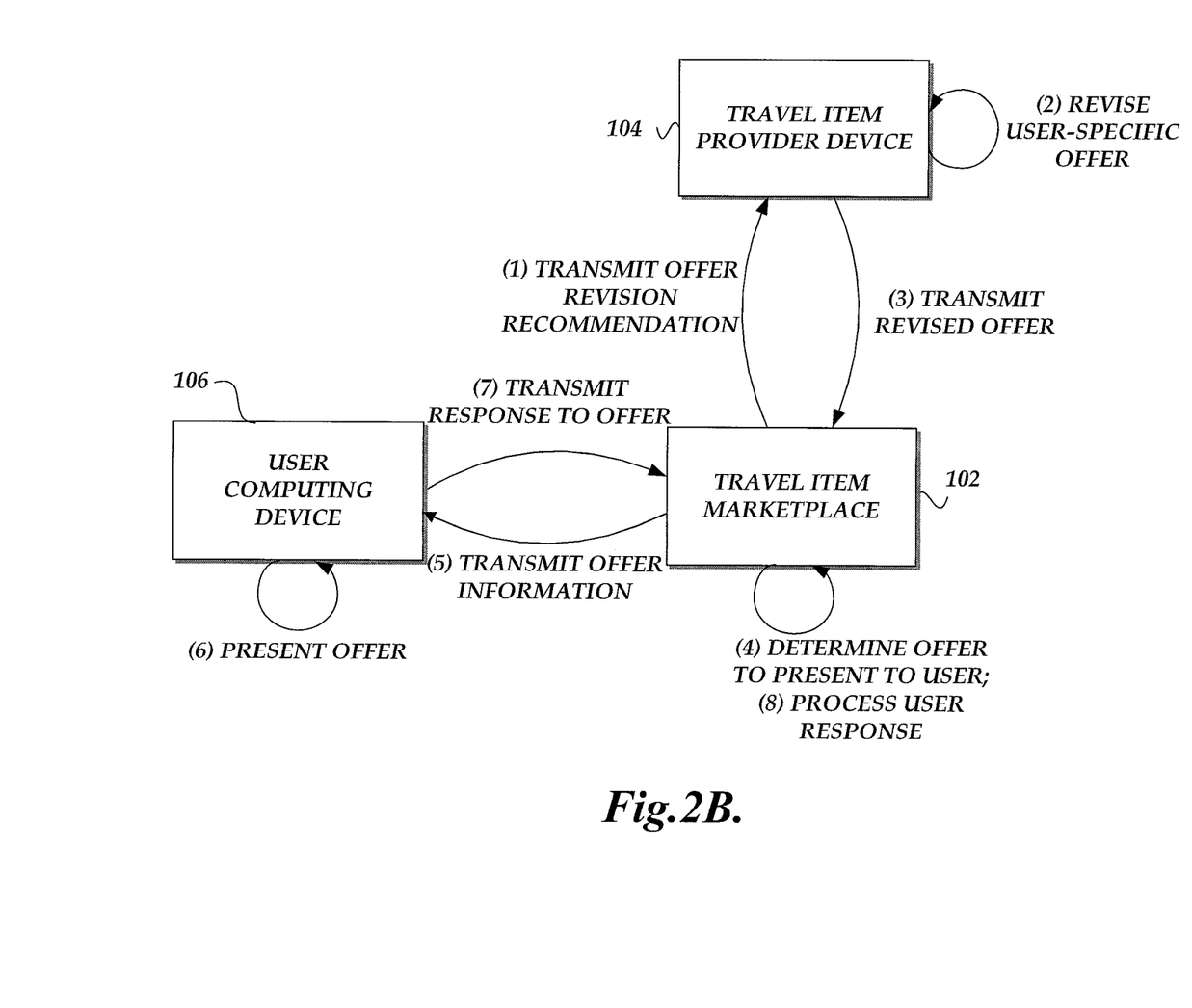

FIGS. 2A and 2B are illustrative block diagrams depicting interactions for generating an providing user specific-offers to a user computing device 106. With reference to FIG. 2A, at (1), a user computing device 106 transmits one or more travel item related requests to the travel item marketplace 102. The requests may correspond to browsing, searching, viewing or otherwise accessing travel item information via the travel item marketplace. For example, a user may submit a hotel search query via an associated user computing device for hotel-stay options for a specific city during a period of time, and may subsequently view various results returned from the travel item marketplace.

At (2), the travel item marketplace 102 monitors user interactions with the marketplace to determine one or more travel items that are potentially of interest to the user. The travel item marketplace 102 can monitor or track an individual user's interactions or behavior as the user views, browses, or shops for travel items or otherwise interacts with the travel item marketplace. Monitoring the user's interactions with the travel item marketplace 102 may include, for example, monitoring the number, category, or sequence of travel items acquired, viewed or searched for by a user (e.g., via a network site corresponding to the travel item marketplace, as illustrated in FIG. 1), and their associated dates, times, levels of service, etc. The travel item marketplace 102 may achieve this by recording a history of specific network resources (e.g., Web pages, media items, etc.) that the user has accessed during each interaction with the travel item marketplace 102 (e.g., each browse session). Based on the user's interactions, the travel item marketplace 102 may identify one or more travel items of potential interest to a user of the user computing device 106. Illustratively, travel items of potential interest to the user may include any travel item that the user has reviewed for more than a threshold period of time (e.g., 10 seconds), as well as travel items related to those that the user has reviewed for more than the threshold period of time. Related travel items may be identified, for example, based on a similarity in the travel items themselves (e.g., a similarity in location, star rating, price, brand, etc.). For example, if a user searched for lodging options for the week of Dec. 20, 2014 until Dec. 27, 2014 in Maui, Hi., and subsequently viewed room availability at Four Seasons Resort Maui, then Four Seasons Resort Maui, Ritz-Carlton Kapalua, Westin Kaanapali, or other high end hotels located in Maui may be identified. Further, airliners having flights to and from Maui for that timeframe or rental car agencies serving the Maui market can be identified as well. In some instances, related travel items may be identified based on user interactions with the travel items. For example, a first travel item may be related to a second travel item when users who view the first travel item also tend to view the second travel item. Travel items may further be related when they are combined or combinable into a package of travel items. For example, a first travel item may be related to a second travel item when the travel item marketplace 102 offers both for acquisition as a "package deal," or when rules maintained by the travel item marketplace 102 would allow both the first and second travel items to be included within such a package (regardless of whether such a combination has actually occurred). Additional related travel items may be identified based on any number of recommendation mechanisms known within the art. For example, the travel item marketplace 102 may consider a first and second travel item as related when a recommendation algorithm would recommend the first travel item to a user viewing the second travel item. In some embodiments, related travel items may further be identified based on a user's predicted travel interests. Embodiments for predicting the travel interests (e.g., the desired travel plan) of a user are described in more detail within the '425 application, incorporated by reference above.

Further, the travel item marketplace 102 may enable a user to explicitly specify one or more travel items of interest. Illustratively, the travel item marketplace 102 may enable a user to save or remove travel items the user has viewed or searched for, and the travel item marketplace 102 may treat saved travel items with greater emphasis (e.g., by excluding data that conflicts with the travel items, by giving the travel items higher weight, etc.) when performing some or all functionalities disclosed herein. In other embodiments, the travel item marketplace 102 may enable users to designate travel items as particularly relevant or favored by the user. User designations for a travel item can thereafter be communicated to travel item providers, along with a notification that the user may be interested in receiving a customized offer for the travel item. For example, when a travel item provider is notified that a user could potentially be offered user-specific offer terms, the provider may also be notified that the user has "favorited" or otherwise designated a travel item of the provider.

After identifying one or more travel items of potential interest, the travel item marketplace 102 may, at (3), identify travel item providers associated with the identified travel items, to enable those travel item providers to create user-specific offers for the travel items. Then, at (4), the travel item marketplace 102 can provide a notification of the user's potential interest to the travel item provider devices 104 of those travel item providers. The notification may further include information regarding the user, such as a user's predicted interest in a travel item, a predicted propensity to purchase a travel item, a predicted value of the user to the provider (e.g., based on a history of brand loyalty, travel item purchases, etc.) or other information regarding the user. Illustratively, the travel item marketplace 102 may determine a user's predicted propensity for acquiring a travel item based on monitoring behavioral data of the user while on the travel item marketplace 102, and comparing that behavioral data to past users who have either acquired or not acquired a travel item. Such behavioral data may include, but is not limited to, the number of searches that a user has conducted in a specific period of time prior to a present use of the travel item marketplace 202 (e.g., a prior two week period), the types of travel items searched for during that period of time (e.g., flights, hotels, cars, etc.), the number of different travel items viewed by the user during that period of time, the number of past acquisitions made by the user, the period of time elapsed since a last travel item acquisition by the user, the "booking window" for the last search conducted by the user (e.g., the difference between the time period in which a travel item is desired for booking and the time period at which the search for the travel item is conducted), the total length of booking associated with the last search conducted (e.g., number of hotel nights searched for, duration of round trip airfare, etc.), or the method in which a user accesses the travel item marketplace 102 (e.g., the specific hyperlink selected or search engine used by a user to access a web page of the travel item marketplace 102). Illustratively, the travel item marketplace 102 may generate a set of training data including behavioral data for past users of the travel item marketplace 202, and associating that behavioral data with whether the user did or did not acquire a travel item on the travel item marketplace 102. The travel item marketplace 102 may thereafter analyze the behavioral data according to a machine learning algorithm to determine, for each item of behavioral data a coefficient indicating that item of behavioral data's effect on the user's predicted propensity to acquire a travel item. For example, use of a first search engine may be associated with a higher coefficient than use of a second search engine, indicating that users arriving at the travel item marketplace 102 via the first search engine have a higher propensity to acquire at least one travel item than users arriving at the travel item marketplace 102 via a second search engine. Coefficients for each significant item of behavioral data may be combined into a mathematical algorithm (such as a linear algorithm), to determine the propensity of any user of the travel item marketplace 102 to acquire a travel item, based on the behavioral data of that user. This propensity may then be reported to travel item provider devices 102 to enable the generation of customized service offers for the user.

Prior to transmission to travel item provider devices 102, the travel item marketplace 102 may anonymize or aggregate user information to ensure adequate protection of user privacy. For example, name, address, phone number, or other sensitive personal identifiers can be removed or excluded from the user information. The travel item marketplace 102 may also employ data privacy or anonymity methods or framework, such as k-anonymity, to cleanse or oversee the user information to be presented. Further, users may be required to provide consent to having limited or anonymized data provided to travel item provider devices for the purpose of receiving customized offers. In addition, the travel item marketplace 102 may verify that information of the user satisfies a set of notification criteria established by each travel item provider or the travel item marketplace 102 itself. For example, the travel item marketplace 102 may verify that the user's predicted buying propensity or predicted value satisfies a threshold value, such that the travel item provider would be interested in providing a customized offer to the user. In some embodiments, the travel item marketplace 102 may enable a travel item provider to set up criteria for the type, frequency, condition, preference, contingency, etc., of user information that the travel item marketplace 102 presents to the provider. For example, a popular business-oriented hotel may be only interested in extending special offers during off-seasons to business travelers who are highly likely to make a purchase within the next 24 hours. As another example, an airliner may only be interested in learning about relevant casual travelers who have a high degree of tolerance for connection time.

In addition to information regarding the user, the travel item marketplace 102 may provide the travel item provider with information specifying one or more recommended travel items or offer terms to be included within a user-specific offer. Such terms or travel items may be determined based on the previously described analysis of user behavioral data. For example, offer terms for customized travel items may be determined based on an estimated likelihood of acceptance by a user (e.g., as exceeding an estimated acceptance threshold). As a further example, offer terms may be suggested based on cost or pricing information of the travel items offered (e.g., such that costs or profits are maintained within a specific amount or margin). In other embodiments, by analyzing users' behavioral data in conjunction with travel item provider devices' behavioral data (e.g., their offer or sales history), the travel item marketplace 102 may independently identify offer settings that are most likely accepted by both a corresponding travel item provider and user. Various optimization methods, such as expectation-maximization (EM) algorithms, genetic or dynamic programming, gradient descent methods, etc., can be employed to identify most promising offer settings. The recommendation of offer terms, settings, or hints can be made prior to, during or after a travel item provider proposes or extends an offer.

In some instances, the travel item marketplace 102 may recommend offer terms to a travel item provider device 104 based on the specific travel items of interest to a user. For example, where the travel item marketplace 102 determines that a user is interested in a first travel item (e.g., a flight), the travel item marketplace 102 may transmit notifications to providers of other travel items (e.g., hotels) as well as a recommendation that such providers offer the user a discount on a combination of the first travel item and one or more other travel items. For example, travel item marketplace 102 may determine that a user is interested in a flight to a specific city. The travel item marketplace 102 may therefore transmit a notification to hoteliers in that city, recommending that the hoteliers to extend a discount on hotel accommodations if the user purchases the first and second items as a package. For example, the travel item marketplace 102 may recommend that the hoteliers to extend a discount that matches the cost of the flight—essentially making the flight free of charge as perceived by the user.

The information presented to the identified travel item provider by the travel item marketplace 102 can further include statistics related to travel items that may be included within a user-specific offer. For example, the travel item marketplace 102 may notify a travel item provider of a total number of users who have indicated interest in a travel item during a specific period of time (see FIG. 4, item 412), as well as information regarding those users (e.g., categories of the users, such as business travelers, recreational travelers, event-driven travelers, etc.). Categorization of users and travel queries conducted by users is discussed in more detail within the '768 application, incorporated by reference above. In other embodiments, the information can include interferences made by the travel item marketplace 102 (e.g., user's degree of loyalty to travel item provider devices, likelihood to purchase within a specific timeframe, sensitiveness to changes or promotions in different attributes of travel items, etc.).

The information provided to the travel item provider devices 104 by the travel item marketplace 102 may further include performance statistics, analysis, or predictions related to the user computing device 106 or to relating to past user-specific offers transacted on the travel item marketplace 102. For example, the travel item marketplace 102 may present offer acceptance statistics to individual travel item provider devices 104, and in some cases, in comparison with average offer acceptance rate for past user-specific offers including travel items similar to those provided by the travel item provider device 104. In some embodiments, performance statistics may include aggregated financial information regarding user-specific offers, such as an amount saved by an individual or set of customers, a number of travel items sold via user-specific offers, a total value of accepted user-specific offers to an individual or set of travel item provider devices, etc. The offer performance information can further assist travel item provider devices in proposing, extending or modifying customized offers.

Figure 4:
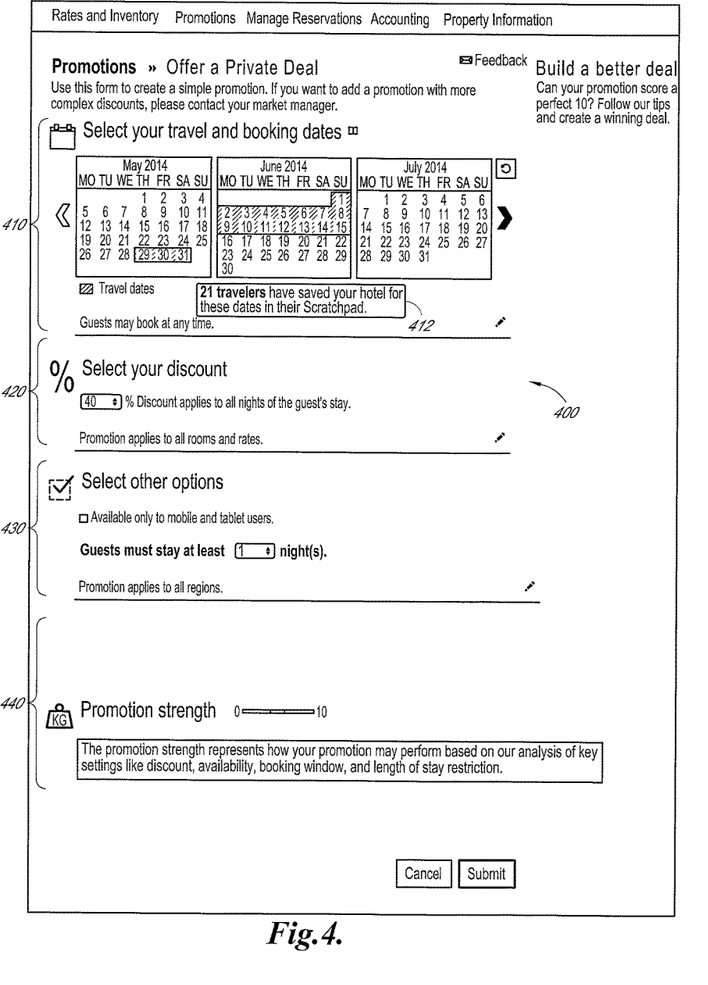
FIG. 4 depicts an illustrative user interface for travel item provider devices to submit user-specific offer details to the travel item marketplace.

In some embodiments, the travel item marketplace 102 can provide travel item provider devices one or more templates to utilize for specifying offer details. For example, as illustrated in FIG. 4, an offer template (400) for a hotel to utilize is implemented as a user interface, which includes selectable dates and times when the offer is applicable (410), user information (412), discount specification (420), other conditions or options (430), and an estimated promotion strength (440). The travel item marketplace 102 may also enable travel item provider devices to design offers based on a pre-defined grammar, which allows for more complex offer settings such as conditional triggers, inventory control logic, applicability of multiple offers or promotions, etc. The travel item marketplace 102 may further provide manual offer input by travel item provider devices assisted by human operators for various scenarios not well suited for an automated system.

With reference back to FIG. 2A, at (5), the travel item provider 104 generates one or more user-specific offers. For example, the travel item provider may prepare private offers or promotions for users included in a portion of the user information or prescribe user targeting criteria based on their own analysis of the information. The travel item provider may or may not utilize the offer template provided by the travel item provider to generate the offer. At (6), the travel item provider 104 transmits the user-specific offer to the travel item marketplace 102 for further processing.

In some instances, travel item providers may specify criteria for use by the travel item marketplace 102 in automating creation of customized offers by a provider. For example, a provider may indicate to the travel item marketplace 102 that users matching a specific set or range of criteria (e.g., with respect to expected propensity to buy, expected propensity to accept an offer, expected future value, etc.) should be provided with customized offers with a predetermined set of terms. Accordingly, the travel item marketplace 102 may be configured to identify such users (e.g., based on the user's viewing of travel items of the provider, travel items of a competitor, or travel items compatible with the travel items of the provider), and automatically transmit a customized offer to the user. In such instances, interactions (4) through (6) may therefore be omitted.

At (7), the travel item marketplace 102 may evaluate the user-specific offer. This may be achieved during or after creation of the offer by the travel item provider (e.g., after completion of an offer template by the provider). Illustratively, the travel item marketplace 102 can evaluate the proposed offer based on its terms (e.g., discount, room upgrades, add-on services, availability, booking window, or length of stay restriction for a lodging offer.) The travel item marketplace 102 can perform this evaluation using statistical or historical travel-related transactional data, such as offer/acceptance data or regular sales data of similar travel items for similar users under similar conditions. For example, the travel item marketplace 102 may determine that a specific user or group of users are sensitive to discounts and can reliably project a rate of offer acceptance against a percentage of discount included in the offer using linear regression methods. Accordingly, the travel item marketplace 102 can estimate a likelihood of acceptance based on a discount percentage of the offer. Various other data mining, machine learning, or collaborative filtering techniques can be employed in this regard.

With reference to FIG. 2B, at (1), the travel item marketplace 102 can provide offer assessment or revision recommendation to the travel item provider 104. Illustratively, the travel item marketplace 102 may report evaluation results (e.g., "promotion strength" (440) as illustrated in FIG. 4) to assist the travel item provider in improving the efficacy of offers or promotions. As another example, the travel item marketplace 102 may indicate that, based on historical acceptance rates of similar users or offers, the proposed offer has a 50% likelihood of being accepted by an individual user or within a range of targeted users. The travel item marketplace 102 may also identify changes (e.g., an increase in discount of a set percentage or dollar amount, an increase in amenities, etc.) that can be made to one or more settings of a proposed offer, which can improve the likelihood of acceptance from 50% to 75%. At (2), the travel item provider 104 may optionally revise the user-specific offer based on the offer assessment or revision recommendation received. For example, the travel item provider may adjust the discount rate of the offer or include additional complimentary amenities in the offer. At (3), the travel item provider 104 optionally transmits the revised offer to the travel item marketplace 102 for further processing.

At (4), the travel item marketplace 102 determines one or more offers and associated information to send to corresponding user computing device(s) 106. In some embodiments, the travel item marketplace 102 prioritizes the offers or promotions to a user based on inferred quality of the offers or promotions. Illustratively, a user may be targeted by multiple offers or promotions from a variety of providers. The user, however, may be more likely to accept some offers than others. On the other hand, certain private offers or promotions may be associated with limited inventory such that they should be presented to only a limited number of high quality users at a time. Should any user decline the offer, a subsequent high quality user should be notified and presented the offer.

As discussed above, the travel item marketplace 102 may infer a likelihood of offer acceptance specifically for individual users. Alternatively or in addition, the travel item marketplace 102 may prioritize the offers or promotions based on inferences made from user profile or behavioral data (e.g., urgency of a user's travel needs, propensity to purchase within the same browse session, accuracy of travel interest, etc.) Accordingly, the travel item marketplace 102 may sort the received offers based on the inferences made and cause presentation of the offers in the sorted order.

In some embodiments, the travel item marketplace 102 may enable users to specify preferences for receiving user-specific offers, and the travel item marketplace 102 may determine offers to present in accordance with the user preferences. For example, certain users may have specified that they are only interested in receiving a threshold number of offers in a given time period, that they are only interested in receiving offers with a specified range of terms (e.g., above a certain value, including specific upgrades, etc.), or that they are only interested in receiving offers from specified providers.

The travel item marketplace 102 may also determine conflicts or connections among offers or promotions and determine to send them for presentation in an organized and meaningful way. For example, the travel item marketplace 102 may categorize offers based on their quality level, cause presentation of offers along a timeline or on a map, supplement offers with relevant contextual information, etc. The travel item marketplace 102 may, for example, indicate discounts or concessions for individual travel items within the user-specific offer, or may indicate the identity of travel item provider(s) who contributed to the offer. In some embodiments, the travel item marketplace 102 may determine additional information to present to the user regarding the offer that may increase the likelihood of acceptance by the targeted user. For example, the additional information may include a limited quantity of the offer, a time by which the offer or promotion will expire, statistics of most recent offer or booking activities related to the travel item or provider, or other information incentivizing the user to accept the offer.

Figure 3:
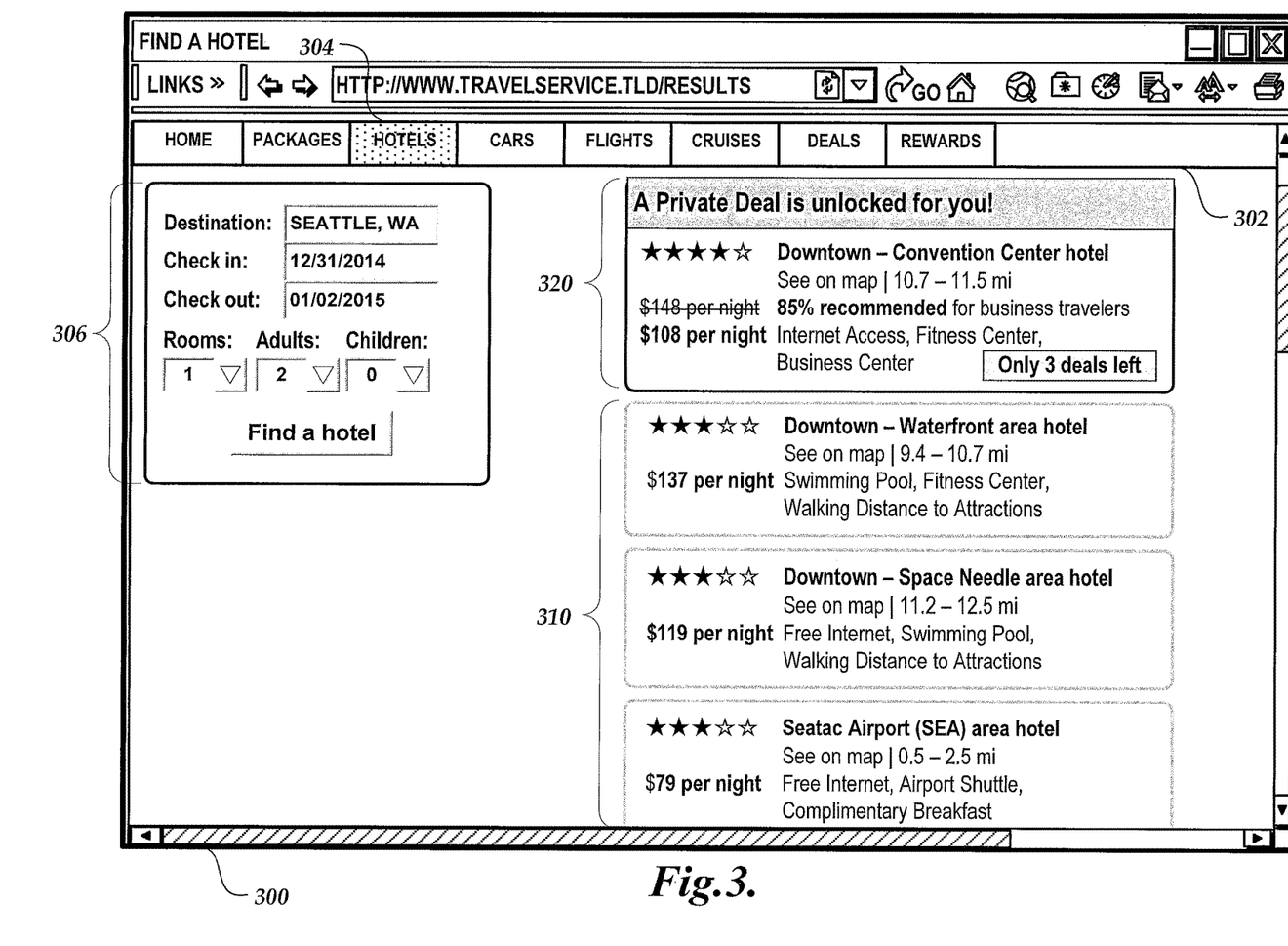
FIG. 3 depicts an illustrative user interface for presenting user-specific offers to corresponding users.

At (5), the travel item marketplace 102 transmits determined offer information to the corresponding user computing device 106. The offer information, when processed by the user computing device 106, may enable a user to accept, decline, propose modifications, or otherwise provide feedback to one or more offers or promotions presented. At (6), the user computing device presents the user-specific offer and any additional information to the user based on the offer information. Illustratively, the offer may be presented via a browser-based user interface (300) as depicted in FIG. 3. The user interface (300) may include tabs (304) indicating a category of travel items, search query input area (306) for travel items that the user is interested in, a display area (302) for displaying search results compiled or generated by the travel item marketplace. In accordance with the user interface (300), a user-specific offer (320) is presented on top of a list of travel item related search results (310) in response to the user's search query. The user's search query may or may not correspond to one or more travel items included in the user-specific offer.

At (7), the user computing device 106 sends a response to the user-specific offer to the travel item marketplace 102. Illustratively, the response may indicate the user's acceptance, rejection, counter-offer, or proposed modifications to the offer. At (8), the travel item marketplace 102 processes the user response. For example, upon receiving a user's rejection of a presented offer, the travel item marketplace 102 may enable the user to select a different discount feature or promotional direction, which is more appealing to the user. The travel item marketplace 102 may contact the corresponding travel item provider if it can be determined or inferred that the travel item provider may be willing to modify the offer as modified. The travel item marketplace 102 may also present other offers or promotions based on the added knowledge of user feedback, for example, by re-sorting or re-ordering available offers or promotions to be presented to the user. As another example, if the user accepts an offer, the travel item marketplace 102 may enable the user to share the deal with a friend or relative. It should be noted that the sharing of the offer and another party's subsequent acceptance, rejection or other engagement with the shared offer may be considered part of the user's or the other party's behavioral data, which in turn may contribute to the determination of future customized offers.

In some embodiments, the travel item marketplace 102 may alert travel item provider devices whose offer to corresponding users has expired. The travel item market place may recommend resubmitting the offer to the travel item market with or without modifications based on updated user behavioral data. In some embodiments, the travel item marketplace 102 may also alert users that certain offers customized for them have expired. The travel item marketplace 102 may identify these expired offers based on an updated analysis of user behavior that indicates a high probability that a corresponding user may accept the offer at this time. The travel item market place may enable the users to react to the expired offers, for example, by forwarding to the travel item provider who extended the offer a request to revive or reinstate the offer, with or without modifications.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer implemented method comprising:
under control of a hardware computing device configured with specific computer executable instructions,
collecting first interaction data representing travel item marketplace interactions of one or more users arriving at a travel item marketplace from a first network resource, and second interaction data representing travel item marketplace interactions of one or more users arriving at the travel item marketplace from a second network resource;
creating a training set comprising at least the first interaction data and the second interaction data;
training a machine learning model using the training set;
detecting at least one travel related activity of a user corresponding to the travel item marketplace;
determining a travel related shopping interest of the user based at least in part on the travel related activity;
identifying a travel item provider associated with the travel item marketplace;
identifying at least one travel item that corresponds to the travel related shopping interest, wherein the travel item is associated with an offer including an offer term;
determining, using the machine learning model, an estimated propensity of the user to purchase the travel item in response to a customized offer for the travel item;
transmitting, to the travel item provider, interest data regarding a potential interest of the user in the travel item, wherein the interest data represents at least:
the offer for the travel item;
a revised offer term for the offer; and
the estimated propensity of the user to purchase the travel item in response to the customized offer for the travel item, wherein the customized offer includes the offer with the revised offer term;
receiving, from the travel item provider, the customized offer for the travel item;
generating a user interface comprising a list of travel item search results, wherein the customized offer is placed at the top of the list; and
receiving, from the user, feedback to the information corresponding to the customized offer.

2. The computer-implemented method of claim 1, wherein the at least one travel-related activity includes at least one of browsing, viewing, searching, or shopping for travel items.

3. The computer-implemented method of claim 1, wherein the at least one travel item includes at least one of flights, automobile rentals, hotel stays, sporting events, or travel insurance.

4. The computer-implemented method of claim 1 further comprising evaluating the customized offer against other offers targeting the user.

5. The computer-implemented method of claim 4, wherein the feedback to the information corresponding to the customized offer includes at least one of accepting the customized offer, declining the customized offer, or proposing modifications to the customized offer.

6. The computer-implemented method of claim 5 further comprising transmitting an indication of the feedback to the travel item provider.

7. A system comprising:
at least one data store configured to at least store computer-executable instructions; and
at least one processor in communication with the data store, the processor configured to execute the computer-executable instructions to at least:
collect first interaction data representing travel item marketplace interactions of one or more users arriving at a travel item marketplace from a first network resource, and second interaction data representing travel item marketplace interactions of one or more users arriving at the travel item marketplace from a second network resource;
create a training set comprising at least the first interaction data and the second interaction data;
train a machine learning model using the training set;
determine a travel-related shopping interest of a user;
determine at least one travel item that corresponds to the travel-related shopping interest, wherein the travel item is associated with an offer including an offer term;
determine, using the machine learning model, an estimated propensity of the user to accept a customized offer for the travel item, wherein the estimated propensity is based at least in part on the first interaction data and the second interaction data;
transmit information about the user in relation to generating the customized offer for the travel item, wherein the information about the user represents:
the offer for the travel item;
a revised offer term for the offer; and
the estimated propensity of the user to accept the customized offer, wherein the customized offer includes the offer with the revised offer term;
receive the customized offer;
detect a travel-related shopping activity from the user; and
cause presentation of a user interface comprising a display object representing the customized offer in response to the travel-related shopping activity.

8. The system of claim 7, wherein the processor is configured to execute further computer-executable instructions to at least monitor the user's travel-related interactions with the system.

9. The system of claim 8, wherein the processor is configured to execute further computer-executable instructions to at least determine the travel-related shopping interest based, at least in part, on the user's travel-related interactions with the system.

10. The system of claim 8, wherein the processor is configured to execute further computer-executable instructions to at least detect the travel-related shopping activity from the user's travel-related interactions as monitored.

11. The system of claim 8, wherein the processor is configured to execute further computer-executable instructions to at least evaluate the customized offer based, at least in part, on information derived from the user's travel-related interactions.

12. The system of claim 7, wherein the travel-related shopping activity includes at least one of browsing or searching for travel items, viewing detailed information of a travel item, or accessing travel-item related information via an email or text-message.

13. The system of claim 7, wherein the processor is configured to execute further computer-executable instructions to determine the customized offer based at least partly on at least one of a discount, upgrade, amenity, term, likelihood of acceptance, travel item of interest, complimentary travel item, or estimated user value to a travel-item provider.

14. The system of claim 7, wherein the information about the user includes at least one of a travel item of interest, complimentary travel item, estimated user value to a travel-item provider, or likelihood of acceptance.

15. The system of claim 7, wherein the information about the user is anonymized.

16. The system of claim 7, wherein the information about the user corresponds to aggregate information of a clustered group of users.

17. A computer-implemented method comprising:
under control of a hardware computing device configured with specific computer-executable instructions,
collecting first interaction data representing travel item marketplace interactions of one or more users arriving at a travel item marketplace from a first network resource, and second interaction data representing travel item marketplace interactions of one or more users arriving at the travel item marketplace from a second network resource;
creating a training set comprising at least the first interaction data and the second interaction data;
training a machine learning model using the training set;
determining a travel-related shopping interest of a user;
determining two or more travel items corresponding to the travel-related shopping interest, wherein the two or more travel items are associated with an offer for the two or more travel items, and wherein the offer includes an offer term;
determining, using the machine learning model, an estimated propensity of the user to accept a customized offer for the two or more travel items, wherein the estimated propensity is based at least in part on travel item marketplace interactions of one or more users arriving at the travel item marketplace from at least one of the first network resource or the second network resource;
transmitting, to a plurality of travel-item providers, information about the user in relation to generating the customized offer for the two or more travel items, wherein the information about the user represents:
the offer for the two or more travel items;
a revised offer term for the offer; and
the estimated propensity of the user to accept the customized offer, wherein the customized offer includes the revised offer term;
receiving, from individual travel-item providers of the plurality of travel-item providers, information contributing to the customized offer; and
causing presentation of a user interface comprising a display object representing the customized offer.

18. The computer-implemented method of claim 17 further comprising providing a template for generating the customized offer to at least one of the plurality of travel-item providers.

19. The system of claim 7, wherein the first network resource comprises a first search engine and wherein the second network resource comprises a second search engine different than the first search engine.

20. The system of claim 7, wherein to train the machine learning model, the processor is configured to execute further computer-executable instructions to at least: determine, according to a machine learning algorithm, a coefficient based at least in part on the first interaction data, wherein the coefficient represents an effect of the first interaction data on a predicted user propensity to acquire a travel item; and combine the coefficient with one or more other coefficients into a mathematical algorithm, wherein the machine learning model comprises the mathematical algorithm with the coefficients.

* * * * *

UNITED STATES PATENT AND TRADEMARK OFFICE
CERTIFICATE OF CORRECTION

| | | |
|---|---|---|
| PATENT NO. | : 10,956,995 B1 | Page 1 of 1 |
| APPLICATION NO. | : 15/217804 | |
| DATED | : March 23, 2021 | |
| INVENTOR(S) | : David Elias Fleischman | |

It is certified that error appears in the above-identified patent and that said Letters Patent is hereby corrected as shown below:

In the Specification

In Column 2, Line 65, delete "market place" and insert --marketplace--.

In the Claims

In Column 15, Line 7, Claim 1, delete "computer implemented" and insert --computer-implemented--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*